United States Patent [19]

Toriumi et al.

[11] Patent Number: 5,896,227
[45] Date of Patent: Apr. 20, 1999

[54] RETROREFLECTIVE SHEETING AND METHOD FOR FORMING SAME

[75] Inventors: Naoyuki Toriumi, Zama; Michiru Hata, Sagamihara, both of Japan

[73] Assignee: Minnesota Mining and Manufacturing Company, St. Paul, Minn.

[21] Appl. No.: 08/942,433

[22] Filed: Oct. 1, 1997

[30] Foreign Application Priority Data

Oct. 1, 1996 [JP] Japan .................................. 8-260603

[51] Int. Cl.⁶ .................................................. G02B 5/128
[52] U.S. Cl. ................................... 359/536; 359/540
[58] Field of Search ........................... 359/529, 534–542, 359/900; 427/163.4; 428/327, 406, 407

[56] References Cited

U.S. PATENT DOCUMENTS

| | | |
|---|---|---|
| 3,005,382 | 10/1961 | Weber . |
| 3,190,178 | 6/1965 | McKenzie . |
| 4,025,159 | 5/1977 | McGrath . |
| 4,069,281 | 1/1978 | Eigenmann ........................ 264/264 |
| 4,605,461 | 8/1986 | Ogi ................................... 156/156 |
| 4,712,867 | 12/1987 | Malek . |
| 5,316,406 | 5/1994 | Wyckoff ............................ 404/404 |

FOREIGN PATENT DOCUMENTS

| | | |
|---|---|---|
| 0 672 921 A2 | 9/1995 | European Pat. Off. . |
| 0 683 268 A2 | 11/1995 | European Pat. Off. . |
| 53 46363 | 4/1978 | Japan . |
| 53-46371 | 4/1978 | Japan . |
| 55 65524 | 11/1978 | Japan . |
| 57-10102 | 1/1982 | Japan . |
| 57-193352 | 11/1982 | Japan . |
| 57 27748 | 4/1984 | Japan . |
| 2 251 091 | 5/1991 | United Kingdom . |

*Primary Examiner*—James Phan
*Attorney, Agent, or Firm*—Robert H. Jordan

[57] ABSTRACT

A method for forming retroreflective sheeting comprising a binder layer having a first surface with protrusions thereon and a plurality of retroreflective elements partially embedded in the surface, wherein the method comprises forming the binder layer in a first profile, embedding the retroreflective elements therein, and then activating that binder layer such that it is restored to the first profile via shape memory.

13 Claims, 2 Drawing Sheets

RETROREFLECTIVE SHEETING AND METHOD FOR FORMING SAME

FIELD OF INVENTION

The present invention relates to a retroreflective sheeting that provides effective retroreflection at both low and high incidence angles and a method for forming such sheeting.

BACKGROUND

A variety of retroreflective sheetings comprising microspheres have been used for traffic signs, road signs, pavement markings, conspicuity tapes, etc. Illustrative examples include those disclosed in U.S. Pat. No. 3,005,382 (Weber) and Japan-A-57-27748.

These sheetings typically comprise a polymeric binder layer and a plurality of microspheres, typically arranged in a monolayer, partially embedded in and protruding from the binder layer. The microspheres typically have a reflective layer thereon, e.g., aluminum, silver, or dielectric coating, or in other embodiments, the binder layer contains reflective particles, e.g., pigment particles such as titanium dioxide, metal flake, nacreous flakes, etc., which function in optical association with the microspheres to provide retroreflective effect.

These sheetings typically provide the most effective retroreflective performance at incidence angles that are substantially perpendicular to the plane of the monolayer of microspheres.

In many applications, such as traffic signs, a sign and the sheeting thereon are oriented substantially perpendicularly to prevalent the direction of approach and effective retroreflective effect is attained.

To improve retroreflective performance at high incidence angles, e.g., such as is encountered with sheetings used on the sides of vehicles, on the sides of tunnels, guard rails, road surfaces, etc., it has been known to form protrusions in the sheeting such that at least some of the microspheres are oriented so as to be presented more perpendicularly to the observer. This configuration has been used extensively in pavement marking tapes where effective retroreflection at very high incidence angles is desired. See, for example, U.S. Pat. No. 5,316,406 (Wyckoff).

Several approaches to achieving a support layer with protrusions bearing retroreflective elements are known.

In some embodiments, a foaming composition is applied to a desired spot on a flat substrate and a liquid composition, e.g., a paint, containing binder resins and reflective pigments is coated over the substrate surface. Microspheres are scattered on the surface of the liquid composition, becoming partially embedded therein. The composition is cured to secure the microspheres thereto and the foaming composition activated, e.g., with heat, to raise portions of the binder layer thereby forming protrusions with microspheres thereon. Examples of this approach are disclosed in Japanese Publication Nos. A-55-65524 and A-57-193352.

In some embodiments, a substrate made of thermoplastic resins is embossed to form a surface with protrusions thereon. A paint containing binder resins and reflective pigments is coated on the surface in sufficient thickness to fill the indented portions and yield a flat surface. Microspheres are partially embedded in the surface the binder resins cured to secure them there. The construction is then heated to cause the substrate to return to a flat shape, thereby deforming the binder layer to yield protrusions corresponding to the difference in coated thickness of the binder layer. Examples of this approach are disclosed in Japanese Publication Nos. A-53-46363 and A-53-46371.

In some embodiments, a paint which shrinks and forms wrinkles is used. The paint, which contains binder material and reflective pigments, is coated on a substrate, microspheres are partially embedded therein, and the paint then heated to dry it and secure the microspheres therein, and to also cause it to wrinkle, thereby forming protrusions with microspheres thereon. An example of this approach is disclosed in Japanese Publication No. A-57-10102.

Other approaches include forming protrusions and partially embedding microspheres therein as disclosed in U.S. Pat. No. 4,069,281 (Eigenmann) and Japanese Publication No. A-58-237243. GB Patent No. 2,251,091 discloses a retroreflective sheeting comprising microspheres adhered to an aluminum layer and German Patent No. 3,039,037 discloses a vehicle tire with a side face having raised areas to which microspheres are adhered.

Each of these approaches suffers some deficiency. It is frequently difficult to control the depth to which the microspheres are embedded because the microspheres are typically applied to the binder layer before it is cured and/or dried and thus it is still quite soft. It is also difficult to form protrusions of desired shape and size in which the microspheres are uniformly embedded. If the microspheres are not embedded deeply enough, they may tend to be easily dislodged. If the microspheres are too deeply embedded the retroreflective response may be impaired. If the microspheres are not uniformly embedded, the product may not provide a desired uniformity of retroreflective effect. Finally, it is also often difficult in these approaches to form protrusions in the shape of pyramids and prisms which would be advantageous for retroreflection at very high incidence angles.

SUMMARY OF INVENTION

The present invention provides a retroreflective sheeting that provides effective retroreflection at high incidence angles. The invention also provides a method for forming such sheeting.

In brief summary, the method of the invention comprises:
a) providing a binder layer having first and second sides, the binder layer is or can be rendered capable of exhibiting shape memory;
b) shaping the binder layer into a desired first profile such that the first side has a one or more protrusions thereon;
c) providing a plurality of retroreflective elements;
d) applying the retroreflective elements to the first side of the binder layer such that the retroreflective elements are partially embedded in the binder layer and the layer is deformed into a second profile; and
e) activating the binder layer such that it substantially reverts to the first profile while retaining retroreflective elements partially embedded therein. Typically, the method will preferably further comprise, after activating the binder layer to cause reversion to the first profile, the step of:
f) stabilizing the binder support layer in the first desired profile.

Briefly summarizing, retroreflective sheeting of the invention comprises a binder layer with retroreflective elements partially embedded in the surface thereof. The binder layer has first and second sides with the first side having one or more protrusions thereon, the protrusions having one or more retroreflective elements partially embedded thereon.

An important distinction over previously known profiled or patterned retroreflective sheetings is that the binder layer is a so-called "shape memory" material that has been deformed and then activated after the retroreflective elements are embedded therein to achieve the desired final shape.

Sheeting of the invention can provide effective retroreflective effect at very high incidence angles over substantially its entire surface. Sheeting of the invention can be readily made with a desired shape or profile so as to provide effective retroreflective performance for the intended application.

BRIEF DESCRIPTION OF DRAWING

The invention will be further explained with reference to the drawing, wherein.

Figure 1:
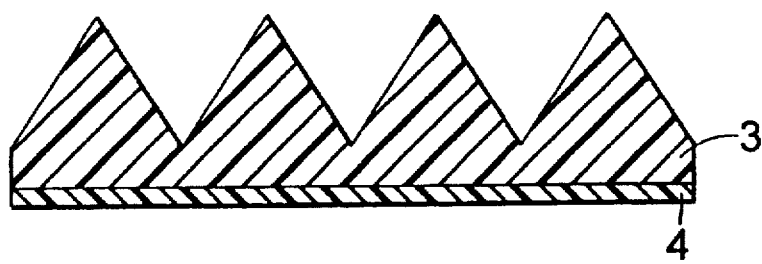
FIG. 1 is a cross section of the binder layer of an illustrative sheeting of the invention in first profile.

These figures, which are idealized, are not to scale and are intended to be merely illustrative and non-limiting.

DETAILED DESCRIPTION OF ILLUSTRATIVE EMBODIMENTS

As discussed above, the method of the invention comprises, in brief summary:

a) providing a binder layer that is or can be rendered capable of exhibiting shape memory and has first and second sides;

b) shaping the binder layer into desired profile such that the first side has a one or more protrusions thereon;

c) providing a plurality of retroreflective elements;

d) applying the retroreflective elements to the first side of the binder layer such that the retroreflective elements are partially embedded in the binder layer and the layer is deformed into a second profile; and e) activating the layer such that it reverts to the first desired profile retaining the retroreflective elements. Typically, the method will preferably further comprise the step of:

f) stabilizing the binder support layer in the first desired profile after reversion.

The binder material in sheetings of the invention comprises a polymeric material that exhibits shape recovery or shape memory, i.e., a tendency when activated to return to a predetermined shape or profile. These are materials that can be deformed under pressure from a first predetermined profile into a second shape or profile and then will return to the first shape or profile, e.g., upon activation by heating with no constricting pressure. The polymer chains of such resins are in a state such that their movement is restricted by physical and chemical intermolecular crosslinking and entanglement of molecules. Such restriction has the effect of allowing shape memory and recovery.

The resins are preferably sufficiently thermoplastic to permit embedment of retroreflective elements therein.

In addition, the binder material preferably will adhere sufficiently to the retroreflective elements such that they are retained in the final product. Also, the binder material is preferably durable, i.e., will withstand use in the intended application without undesirably discoloring, breaking down, flaking, etc. for at least a useful service life.

The binder material preferably exhibits a storage modulus (referred to herein as $M_o$) of: (1) at least about $3 \times 10^6$ dyne/cm$^2$, more preferably between about $1 \times 10^7$ and about $3 \times 10^9$ dyne/cm$^2$, at 25° C., and (2) of less than about $9 \times 10^6$ dyne/cm$^2$, more preferably between about $1 \times 10^5$ and about $5 \times 10^6$ dyne/cm$^2$, at 120° C., measured by dynamic viscoelasticity method. $M_o$ can be measured using RSA II of RHEOMETRIX in a compression mode at a frequency of 1 Hz. Such materials can be effectively and facilely used to form binder layers with a wide range of desired first profiles in accordance with the invention.

If the storage modulus at 25° C. is lower than this range, the resultant binder layer will not exhibit the desired shape memory and will not effectively recover the desired first profile. Furthermore, the retroreflective elements may not be effectively retained by the resultant binder layer, resulting in dislodgement and loss of retroreflective effect.

If the storage modulus at 120° C. is higher than the indicated range, the binder layer will tend to be insufficiently thermoplastic to permit effective embedment of the retroreflective elements therein. As a result the elements may not be effectively retained by the resultant binder layer.

In particular, the storage modulus at 25° C. is preferably at least about $1 \times 10^7$ dyne/cm$^2$ for extended durability in outdoor applications.

The binder material preferably exhibits high flow characteristics to permit easy and effective application to a mold surface with fine features.

Some illustrative examples of known shape memory resins that may be used in the present invention include polybornene, styrene-isoprene copolymers, polyurethane resins, etc. They have softening points in a suitable range to permit effective embedment of retroreflective elements therein during production for effective retention. The softening point is typically within the range of about 80° to about 200° C., preferably between about 90° and about 180° C.

Illustrative examples of preferred monomers include at least one (meth)acrylate monomer that yields a homopolymer having a glass transition temperature between about −50° C. and about 80° C., e.g., phenoxyacrylate isooctyl acrylate, tertiary-butylacrylate. Such materials have been found to exhibit excellent molding properties and excellent shape memory properties upon curing.

The cohesive strength and heat resistance of the ultimate binder layer can be improved by incorporating at least one second (meth)acrylate monomer that produces a homopolymer having a glass transition temperature of between about 80° and about 150° C. Illustrative examples include acrylic acid, isobornyl acrylate, etc. The second monomer is included in an amount constituting 0 to about 85 weight percent of the total monomer components depending upon the monomers. For example if the first monomer is isooctyl acrylate and the second monomer is acrylic acid the amount of acrylic acid is preferably within the range of about 10 weight percent and 40 weight percent. If it is less than 10 weight percent the storage modulus at 25° C. tends to be too low so that the resultant binder layer does not exhibit sufficient shape memory. If the acrylic acid content is above 40 weight percent, the storage modulus at 120° C. is too high and the binder layer does not exhibit sufficient thermoplasticity and adhering to the retroreflective elements is difficult.

Some illustrative examples of polymers that can be used include phenoxyethyl acrylate homopolymers, copolymers comprising about 60 to about 90 weight percent isooctyl acrylate and about 10 to about 40 weight percent acrylic acid, copolymers of isooctyl acrylate and isobornyl acrylate and tertiary butyl acrylate homopolymers.

The binder layer is typically formed by pouring the liquid precursor composition onto a mold that defines the desired first profile and then cured in place. When the precursor composition has relatively high flow characteristics, e.g., a viscosity at 25° C. of between about 1 and about 100 centipoise, a pattern with fine structures can be readily achieved. For example, phenoxyethyl acrylate resins has a viscosity at 25° C. of about 8 to 9 centipoise. A precursor composition consisting essentially of that resin can be quickly poured over a fine pattern mold without trapping air bubbles at the interface with the mold surface. In some instances, it may be desirable to partially polymerize the precursor prior to shaping it on the mold.

Typically the liquid precursor composition will further comprise a crosslinking agent. For example, when the binder layer is made with (meth)acrylic polymers such as phenoxyethyl acrylate, it will also further comprise polyfunctional (meth)acrylic monomers such as 1,6-hexanediol diacrylate as crosslinker.

Depending upon the type of crosslinker, the binder resin, etc., the composition will typically comprise between about 0.01 and about 0.1 parts by weight of crosslinker, more typically between about 0.02 and about 0.05 parts by weight, per 100 parts of (meth)acrylic monomers. Crosslinker will typically increase the heat resistance of the resultant binder layer and contribute to effective shape memory properties. However, if the composition contains excessive amounts of crosslinker the layer may not be sufficiently thermoplastic to permit easy embedment of retroreflective elements therein.

The mold is designed in the form of the desired final shape or profile of the binder layer. Typically the shape will include a plurality of raised portions or protrusions, typically relatively minute in size, which are regularly arranged on a flat base. Illustrative examples include pyramid-like shapes, prisms, cones, partial spheres, frustums, parallel ridges or lines, parallel or nested sinusoids, etc. The desired shapes of the protrusions is determined in part by the desired retroreflective properties and the anticipated use conditions.

Pyramid-like shapes are characterized by side planes extending from the base to the top of the raised portions. Typically it is preferred that the side planes be flat. Typically the slope, i.e., the included angle between the base and side plane, is between about 30° and about 80°, preferably between about 40° and about 75°. If the slope is less than about 30°, retroreflective performance at high incidence angles may be impaired. When the slope exceeds about 80°, retroreflective performance at other incidence angles may be undesirably reduced. The optimum slope for a specific application can be readily selected by one skilled in the art and then readily implemented in accordance with this invention.

The distance from the top of one raised portion to that of an adjacent raised portion is typically in the range of between about 0.1 and about 20 millimeters, preferably between about 0.3 and about 10 millimeters. If the distance is much smaller than this range, the number of retroreflective elements that can be embedded in one protrusion may be too small, resulting in reduced retroreflective brightness. Depending upon the height of the raised portions, if the distance exceeds 20 millimeters, retroreflective performance at high incidence angles may be impaired. Some common dimensions are for the height of the raise portions to be between about 2 and about 5 millimeters and the distance between adjacent raised portions to be between about 10 and about 20 millimeters.

The mold can be made from any of a number of suitable materials, depending in part upon the characteristics of the binder layer composition, the cure conditions, the size of the binder layer being made, etc. Illustrative examples of materials from which molds might be made include glass, plastics, ceramic, and metal.

The desired shape is formed in the mold via an appropriate technique, e.g., molding from a master, tooling, etching, pin bundling, etc.

Once applied to the mold, the liquid precursor composition is polymerized, typically by application of suitable radiation. Illustrative examples include ultraviolet radiation, electron beam, and heat.

Depending upon the formulation, it may be useful to incorporate one or more photopolymerization initiators, e.g., radical polymerization initiators, in the composition to shorten curing time and achieve polymerization with lower amounts of applied radiation. Illustrative examples include benzoin, benzoin methyl ether, benzoin n-propyl ether, benzoin n-butyl ether, benzil, benzophenone, p-methylbenzophenone, diacetyl, eosine, thionine, Michler's ketone, acetophenone, 2-chlorothioxanthone, anthraquinone, chloroanthraquinone, 2-methylanthraquinone, ($\alpha$-hydroxyisobutylphenone, p-isopropyl-$\alpha$-hydroxyisobutylphenone, $\alpha,\alpha'$-dichloro-4phenoxyacetophenone, 1-hydroxy-1-cyclohexylactophenone, 2,2-dimethoxy-2-phenylacetophenone, methylbenzoin formate, 2-methyl-1-[4-(methylthio)phenyl]-2-morpholinopropene, dichlorothioxanthone, diisopropylthioxanthone, phenyldisulfide-2-nitrosofluorene, butyroin, anisoin ethyl ether, azobisisobutyronitrile, tetramethylthriuram disulfide, and the like.

Photopolymerization initiator is typically used at between about 0.1 and 5 parts by weight per 100 parts of monomer. Lesser amounts will typically not provide sufficient benefit. Amounts in excess of 5 parts by weight will typically be uneconomical. Also, residual unreacted initiator may lower the physical properties of the cured material.

Photopolymerization accelerators may be used in combination with photopolymerization initiators if desired. Illustrative examples include tertiary amines such as triethylamine, triethanoamine, 2-dimethylaminoethanol, etc.; alkyl- or arylphosphines such as triphenylphosphine, etc.; and thiols such as $\beta$-thioglycol, etc.

A suitable radiation source can be readily selected by one skilled in the art. Illustrative examples of UV sources include mercury lamps, high pressure mercury lamps, ultra-high pressure mercury lamps, xenon lamps, carbon arcs, metal halide lamps, such light, etc. The construction is preferably under an inert atmospheres during UV exposure when no base film is used.

The UV radiation intensity is typically between about 50 and about 250 W/cm$^2$, and the dose is typically between about 500 and about 5000 mJ/cm$^2$.

Preferably, during UV irradiation the exposed side of the liquid precursor composition (which corresponds to the second side of the binder layer) is covered by a cover sheet or base film that is transparent to UV radiation but which exhibits low oxygen transmission and higher heat resistance than the binder layer. This will permit UV irradiation of the composition while protecting it from oxygen which interferes with polymerization. Also, the base film can protect the binder layer during later fabrication steps, e.g., fusion to press platens during the embedment of the retroreflective elements. Illustrative examples of suitable base films include polyester films, polyolefin films, etc.

The liquid precursor composition may include others additives as desired. Illustrative examples include inorganic and organic fine particles and fillers, stabilizers, pigments, etc. These additives preferably do not interfere unduly with the cure mechanism or impart undesirable properties of the resultant binder layer.

Following curing the binder layer and mold are separated. Depending upon the nature of the binder layer and the material from which the surface of the mold is made, it may be desired to incorporate release agents in the liquid precursor, apply release agents to the surface of the mold before application of the liquid precursor thereto, or use a parting layer to achieve desired release properties.

FIG. 1 shows an illustrative binder layer 3 on base film 4.

Suitable retroreflective elements can be readily selected by those with ordinary skill in the art. The retroreflective elements may be substantially self-contained, i.e., be fully capable of providing retroreflective effect without additional components, or they may need additional components to provide desired retroreflection.

Typically the retroreflective elements will be microspheres. Suitable microspheres can be readily selected by one with ordinary skill in the art.

Typically the microspheres will be glass, ceramic, or polymer, have an index of refraction of between about 1.5 and about 2.2, preferably about 1.9 to about 1.95 in most instances.

The average diameter of the microspheres will typically be between about 40 and about 200 microns, preferably between about 50 and about 150 microns. Microspheres outside this range may be used, however, if they are substantially smaller retroreflective performance of the final article may be impaired due to diffraction effects. Larger microspheres will tend to yield a thicker product. Also, microspheres which are layer cannot be as densely packed and may result in poor uniformity of retroreflective effect across the sheeting.

Preferably the microspheres have a reflective coating on a portion thereof, e.g., a hemispheric coating of aluminum, silver, or a dielectric coating. Such microspheres will be self-retroreflecting. Alternatively, the microspheres may be free of any reflective coating and reflective material such as pigment flakes may be incorporated in the binder layer. This optical system is similar to that used in many retroreflective pavement markings.

The microspheres will typically comprise a reflective layer, e.g., a substantially hemispheric coating of aluminum, silver, or dielectric material thereon.

Alternatively, binder layer may contain reflective particles in at least the stratum in which the microspheres are embedded. Illustrative examples include aluminum flake, nacreous pigment flakes, and titanium dioxide. Suitable particles can be readily selected by those skilled in the art.

The retroreflective elements are typically arranged on a temporary carrier, e.g., partially embedded in a thermoplastic polymer layer on a paper backing. Arranged in this manner, the microspheres are arranged in a monolayer of desired packing density (typically densely packed to provide maximum retroreflective performance in the resultant article) and are also disposed conveniently to apply a reflective layer thereto, e.g., aluminum vapor coat. This technique is very well known among those skilled in the art.

Also, the temporary carrier provides a convenient manner to press the retroreflective elements against the first surface of the binder layer with sufficient pressure to embed the elements in the binder layer.

Optimum conditions for embedding the retroreflective elements in the binder layer will be dependent in part upon the equipment used (e.g., passing the sheetings between rubber rollers), temperature, pressure, bonding time of the binder layer to the elements, first profile, and etc.

In general, the temperature for embedding the retroreflective elements in the binder layer is selected from the range defined by the softening point and pour point of the binder layer and is typically between about 80° and about 140° C. When the heating temperature is too low, the depth of embedment of the retroreflective elements and strength of adhesion to them developed by the binder layer may not be sufficient. When the temperature is too high, the binder layer may not effectively recover its desired first profile.

As pressure is applied to the temporary carrier, the binder layer deforms in two general ways. On a minutely localized manner, the retroreflective elements are in point contact with the binder layer and are forced into the binder layer under substantial pressure and force. Accordingly, the surface portion of the binder layer is plastically deformed. As a result, the shape memory of this surface portion of the binder layer is greatly reduced or lost. In contrast, on more general basis, the protrusions in the binder layer are deformed under relatively low pressure. They substantially retain shape memory properties.

Following embedment, the temporary carrier is stripped off, leaving the retroreflective elements partially embedded into the first surface of the binder layer. Preferably the elements, binder layer, and temporary carrier are such that the elements preferentially adhere to the binder layer. It may be desired to incorporate release agents in the temporary carrier to reduce the adherence to the retroreflective elements and/or to incorporate coupling agents in the binder layer or use other techniques to increase adhesion of the binder material to the retroreflective elements.

Figure 2:
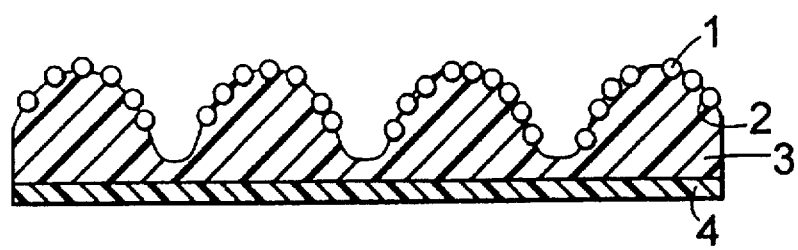
FIG. 2 is a cross section of an intermediate sheeting of the invention showing the binder layer in second profile with reflective elements partially embedded in the surface thereof.

FIG. 2 shows an illustrative intermediate product after the temporary carrier is removed, the product comprising microspheres 1 with aluminum reflective coat 2 partially embedded in the first surface of binder layer 3 on base film 4. As compared to FIG. 1 where the binder layer was in its first profile, binder layer 3 in FIG. 2 is deformed into a second profile.

After the temporary carrier is removed and the pressure removed from the first surface of the binder layer, the intermediate is exposed to heat within the range defined by the glass transition temperature of the binder layer and pour point of the resin. Typically the range will be between about 30° and about 180° C. If the temperature is not high enough, shape recovery may be slow or not occur at all. If the temperature is too high, the binder layer in the protrusions may undergo plastic flow and stabilize in a deformed shape rather than the desired first profile.

Figure 3:
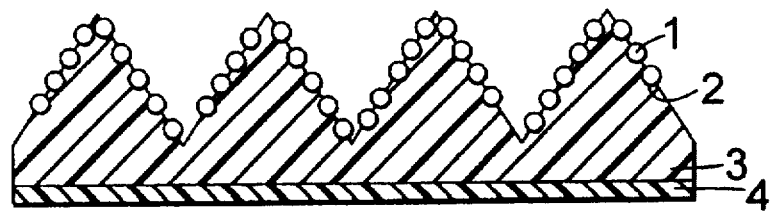
FIG. 3 is a cross section of the finished sheeting wherein the binder layer has undergone shape recovery and is restored to first profile.

FIG. 3 shows a completed sheeting comprising microspheres 1 with aluminum reflective coat 2 partially embedded in the first surface of binder layer 3 on base film 4. As can be seen in comparison with FIGS. 1 and 2, binder layer 3 has been restored to its desired first profile or shape.

In some instances it will be desirable to further crosslink the binder layer after shape recovery. This step is sometimes referred to as post crosslinking or stabilizing the binder layer. Post crosslinking is advantageous for improved environmental durability, e.g., improved heat resistance and solvent resistance. It can also render the binder layer more dimensionally stable under conditions of use.

Post crosslinking can be induced if the binder layer contains one or more crosslinking components that substantially do not participate in the initial cure shape recovery mechanisms. For example, it may contain components that initiate crosslinking at temperatures that are higher than the temperatures to which the binder layer is subjected during initial formation, retroreflective element embedment, and shape recovery. In another approach it may contain moisture cure type crosslinking agents. Polymer radicals formed during electron beam irradiation without the use of crosslinking agent may be utilized.

Illustrative examples of copolymerizable crosslinking agents include heat curing type crosslinking agents such as N-alkoxyalkylacrylamide, acrylamide, N-methylolacrylamide, (meth)acrylates having a phosphoric acid group (including a phosphate group with an active hydrogen atom), glycidyl (meth)acrylates; moisture curing type crosslinking agents such as 2-isocyanatoethyl (meth) acrylate, (meth)acrylates having a silanol group;

(meth)acrylates having an amino, nitroso, or nitro group which performs the crosslinking reaction in the presence of a redox agent; and the like. The amount of post cure crosslinking agent is typically between about 0.1 and about 5.0 weight percent, preferably between 0.5 and 3 weight percent, based on all monomers.

Catalysts may be used in combination with any of the above crosslinking agents to accelerate the crosslinking reactions.

In some instances, it will be desirable to laminate a transparent cover film to the first surface of the binder layer with protruding retroreflective elements thereon, e.g., to attain improved retroreflective performance under wet conditions. In one illustrative approach, if the binder layer exhibits thermoplastic properties, the cover film may be laminated to the first surface of the binder layer and then heat and pressure applied to selected portions of the second surface of the binder layer to cause portions of the binder layer to flow around the retroreflective elements and into contact with the cover film. U.S. Pat. Nos. 3,190,178 (McKenzie) and 4,025,159 (McGrath) disclose such approaches.

Further details of the invention are defined in the features of the claims.

EXAMPLES

The invention will be further explained by the following illustrative examples which are intended to be non-limiting. Unless otherwise indicated, all amounts are expressed in parts by weight.

Figure 5:
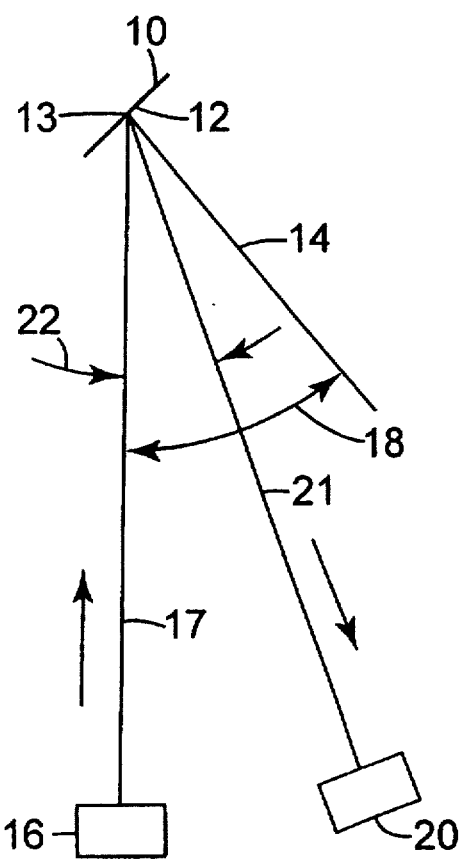
FIG. 5 is a schematic illustrating the apparatus used to evaluate the retroreflective properties of the sheetings in the Examples.

The retroreflective performance of the resultant sheetings was evaluated according to JIS Z 9117 using an apparatus as shown in FIG. 5 with varying incident and observation angles as indicated in Tables 1 and 2. The test method is shown schematically in FIG. 5 wherein is shown sheeting 10 with retroreflective surface 12, sample center 13, the axis 14 normal to surface 12, light source 16, incidence or illumination axis 17, incidence angle 18, receptor 20, observation axis 21, and observation angle 22.

Examples 1, 2, and Comparative Example A

A binder layer was formed from a liquid monomer composition containing 100 parts phenoxyethyl acrylate (PEA from Osaka Organic Chemical Company) and 1 part photopolymerization initiator (DAROCURE™ 1173 from Ciba-Geigy Company). The composition was poured into a mold made of silicone rubber.

Figure 4:
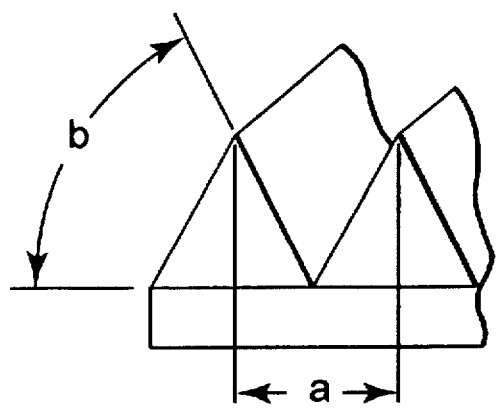
FIG. 4 is a perspective view of a portion of mold for shaping a binder layer in accordance with the invention.

The mold had a raised pattern of isosceles regularly shaped V-shaped grooves as shown in FIG. 4. Distance a was about 1.8 millimeters and Angle b was 70°. Each groove had a depth of about 2.47 millimeters.

The composition was poured onto the mold so as to completely fill the cavities and overflow the raised portions for a total thickness from bottom of groove to surface of about 2.5 millimeters. A 50 micron thick polyester terephthalate film was laid over the exposed side of the liquid composition.

The liquid was cured via exposure to ultraviolet radiation to form the binder layer with desired profile. The UV radiation was a dose of 2500 mJ/cm$^2$ generated by a high pressure mercury lamp (UVL-N from USHIO). The storage modulus, $M_0$, at 25° C. and 120° C. measured by dynamic viscoelasticity method was 1.27×10$^7$ dyne/cm$^2$ and 3.38×10$^5$ dyne/cm$^2$, respectively.

Glass microspheres having a refractive index of about 1.9 and an average diameter of about 70 microns were partially embedded in a temporary carrier comprising a layer of polyethylene on paper. An aluminum reflective layer was vapor deposited on the exposed portions of the glass microspheres to a depth of about 100 nanometers.

The microspheres were laminated to the first surface of the binder layer a hand iron at 120° C. pressed to the back side of the temporary carrier to embed the aluminum coated sides of the microspheres into the binder layer. The microsphere became partially embedded in the binder layer. The protrusions in the binder layer were deformed as shown in FIG. 2.

The first profile was restored by carrying the construction through an oven at about 70° C. for about 10 minutes. The profile of the protrusions was restored and the microspheres remained firmly embedded in the binder layer as shown in FIG. 3.

For Example 2, a retroreflective sheeting was made as in Example 1 except the mold was of a different shape. Distance a was 0.36 millimeters and Angle b was 45°.

For Comparative Example A, a retroreflective sheeting was prepared as in Example 1, except a flat plastic sheet was used instead of the mold such that the binder layer was flat with substantially no protrusions.

The retroreflective performance of the resultant sheetings is tabulated in Tables 1 and 2.

TABLE 1

At an observation angle of 0.2°, the retroreflective brightness of each sheeting (in candela/lux/meter$^2$) at the indicated incidence angle (in degrees) was as follows:

| Incident Angle | Sheeting 1 | Sheeting 2 | Sheeting A |
| --- | --- | --- | --- |
| 55 | 98.2 | 185 | 181 |
| 65 | 68.6 | 123 | 30.2 |
| 75 | 47.2 | 39.1 | 1.47 |
| 80 | 31.0 | 6.64 | 0 |
| 85 | 9.6 | 0 | 0 |
| 89.9 | 0 | 0 | 0 |

TABLE 2

At an observation angle of 1.0°, the retroreflective brightness of each sheeting (in candela/lux/meter$^2$) at the indicated incidence angle (in degrees) was as follows:

| Incident Angle | Sheeting 1 | Sheeting 2 | Sheeting A |
| --- | --- | --- | --- |
| 55 | 13.2 | 19.9 | 28 |
| 65 | 8.12 | 14 | 7.38 |
| 75 | 5.9 | 7.38 | 0.73 |
| 80 | 4.43 | 3.69 | 0 |
| 85 | 1.17 | 0 | 0 |
| 89.9 | 0 | 0 | 0 |

From a comparison of the results of Examples 1, 2, and A, it can be seen that retroreflective sheetings of the invention provided excellent high incidence angle retroreflective performance.

Examples 3 and 4

In Example 3, a retroreflective sheeting was prepared as in Example 1 except a mixture of 99 parts phenoxyethyl acrylate and 1 part N-isobutoxymethylacrylamide (from Nitto Reiken Industries, Ltd.) was used as the curable monomer.

In Example 4, a retroreflective sheeting was prepared as in Example 3 except the binder layer was also post crosslinked by heating at 180° C. for 30 minutes after shape recovery.

The sheetings in Examples 3 and 4 each had similar retroreflective proprieties as those in Example 1.

The sheetings from Examples 1, 3, and 4 were immersed in methyl ethyl ketone. The binder layer of the sheeting in Example 1 dissolved while the binder layers from the sheetings in Examples 3 and 4 did not dissolve.

The storage moduli of the binder layers in the sheetings from Examples 1, 3, and 4 at 160° C. were measured and found to be $1.05 \times 10^5$, $3.75 \times 10^5$, and $1.22 \times 10^6$ dynes/cm², respectively. These results indicate that the sheeting of Example 4 had the highest heat stability among these three sheetings.

Examples 5–10

In Examples 5–10, retroreflective sheetings were prepared as in Example 1 except the following monomer compositions were used. The $M_0$ properties of each are indicated.

Example 5

90% isooctyl acrylate/10% acrylic acid
$M_0$ at 25° C.: $4.83 \times 10^6$ dyne/cm²
$M_0$ at 120° C.: $1.77 \times 10^5$ dyne/cm²

Example 6

80% isooctyl acrylate/20% acrylic acid
$M_0$ at 25° C.: $7.78 \times 10^7$ dyne/cm²
$M_0$ at 120° C.: $5.53 \times 10^5$ dyne/cm²

Example 7

70% isooctyl acrylate/30% acrylic acid
$M_0$ at 25° C.: $8.75 \times 10^8$ dyne/cm²
$M_0$ at 120° C.: $3.60 \times 10^6$ dyne/cm²

Example 8

30% isooctyl acrylate/70% isobornyl acrylate
$M_0$ at 25° C.: $1.52 \times 10^9$ dyne/cm²
$M_0$ at 120° C.: $9.18 + 10^4$ dyne/cm²

Example 9

100% tertiary butyl acrylate
$M_0$ at 25° C.: $4.82 \times 10^8$ dyne/cm²
$M_0$ at 120° C.: $1.14 \times 10^5$ dyne/cm²

Example 10

97% phenoxyethyl acrylate/3% N-methoxymethyl acrylate
$M_0$ at 25° C.: $1.56 \times 10^7$ dyne/cm²
$M_0$ at 120° C.: $1.24 \times 10^6$ dyne/cm²

The sheetings in Examples 5–10 each had similar retroreflective proprieties as those in Example 1.

Various modifications and alterations of this invention will become apparent to those skilled in the art without departing from the scope and spirit of this invention.

What is claimed is:

1. A method for forming a retroreflective sheeting comprising:
   a) providing a binder layer having first and second sides;
   b) shaping said layer into desired first profile such that said first side has a one or more protrusions thereon;
   c) applying retroreflective elements to said first side of said layer such that said retroreflective elements are partially embedded in said layer and said layer is deformed into a second profile; and
   d) activating said layer such that it reverts to said first profile retaining retroreflective elements.

2. The method of claim 1 further comprising the step of:
   e) stabilizing said binder layer in said first desired profile.

3. The method of claim 1 wherein said binder layer comprises a material that exhibits a storage modulus of at least $3 \times 10^6$ dyne/cm² at 25° C. and of less than $9 \times 10^6$ dyne/cm² at 120° C. after being formed into said first profile.

4. The method of claim 1 wherein binder layer comprises a material that exhibits a storage modulus of preferably between about least $1 \times 10^7$ and about $3 \times 10^9$ dyne/cm² at 25° C. and between about $1 \times 10^5$ and about $5 \times 10^6$ dyne/cm² at 120° C. after being formed into said first profile.

5. The method of claim 1 wherein binder layer comprises a material having a softening point between about 80° C. and about 200° C.

6. The method of claim 1 wherein said retroreflective elements comprise microspheres.

7. The method of claim 6 wherein said microspheres have a reflective layer thereon.

8. The method of claim 6 wherein said binder layer contains reflective particles dispersed therein.

9. A retroreflective sheeting comprising a binder layer with retroreflective elements partially embedded in the surface thereof, said surface having protrusions thereon and said binder layer having been shaped via shape memory.

10. The sheeting of claim 9 wherein said binder layer comprises a polymerized resin, said resin having a storage modulus of at least about $3 \times 10^6$ dynes/cm² at 25° C. and about $9 \times 10^6$ dynes/cm² or less at 120° C.

11. The sheeting of claim 9 wherein said retroreflective elements comprise microspheres.

12. The sheeting of claim 9 comprising reflective layers on said microspheres.

13. The sheeting of claim 9 comprising reflective articles dispersed in said binder layer.

* * * * *